United States Patent
Baik et al.

[11] Patent Number: 6,128,289
[45] Date of Patent: Oct. 3, 2000

[54] VOICE CODING METHOD AT A CODE DIVISION MULTIPLE ACCESS BASE STATION

[75] Inventors: Sung Jun Baik; Byung Yang An; Kyung Jun Lee; Hun Lee, all of Daejon, Rep. of Korea

[73] Assignees: Electronics and Telecommunications Research Institute, Daejon; Dacom Corporation, Seoul, both of Rep. of Korea

[21] Appl. No.: 08/987,551

[22] Filed: Dec. 9, 1997

[30] Foreign Application Priority Data

Dec. 9, 1996 [KR] Rep. of Korea .................. 96-63183

[51] Int. Cl.[7] .............. H04B 7/216; H04L 7/00; H04L 7/04
[52] U.S. Cl. .............. 370/342; 375/362; 375/356
[58] Field of Search ................. 370/320, 331, 370/335, 336, 342, 503, 507, 516; 375/356, 362

[56] References Cited

U.S. PATENT DOCUMENTS

| 5,619,491 | 4/1997 | Panzer | 370/342 |
| 5,706,282 | 1/1998 | Chung | 370/280 |
| 5,910,946 | 6/1999 | Csapo | 370/328 |
| 5,974,375 | 10/1999 | Aoyagi et al. | 704/216 |

FOREIGN PATENT DOCUMENTS 0 522 775 A2  1/1993  European Pat. Off. .......... H04L 5/24

*Primary Examiner*—Chi H. Pham
*Assistant Examiner*—Brenda H. Pham
*Attorney, Agent, or Firm*—Cohen, Pontani, Lieberman & Pavane

[57] ABSTRACT

The present invention is to increase the efficiency of the transmission channel between the base stations and to improve the accuracy of the signal in transmitting the traffic information in the circuit communication method or TDM method in comparison with the packet method, and provides the method for speech coding at the Code Division Multiple Access base station which can solve the anticipated problem of the frame sync acquisition between base stations in such case.

6 Claims, 4 Drawing Sheets

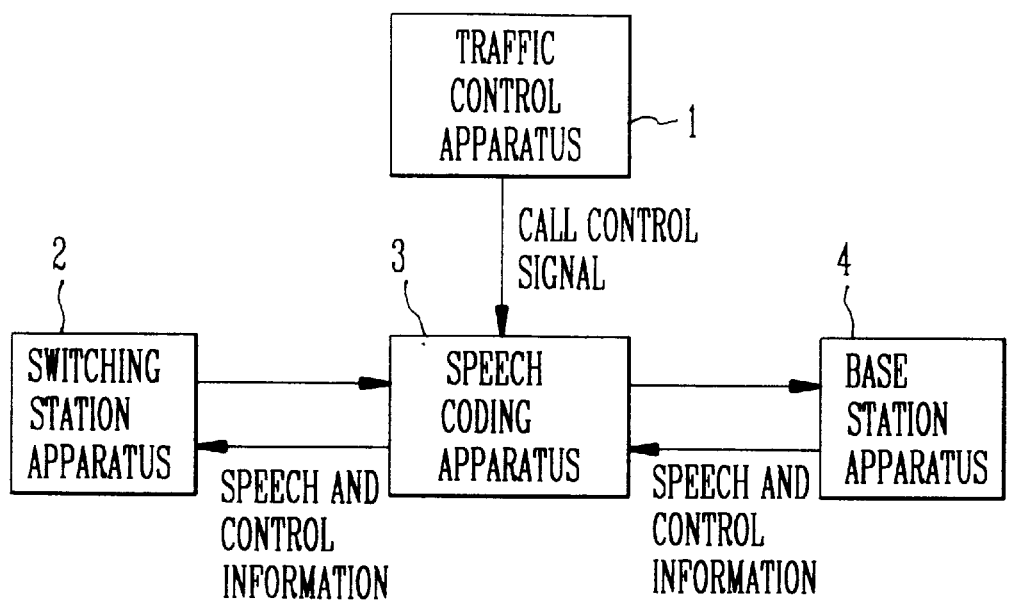
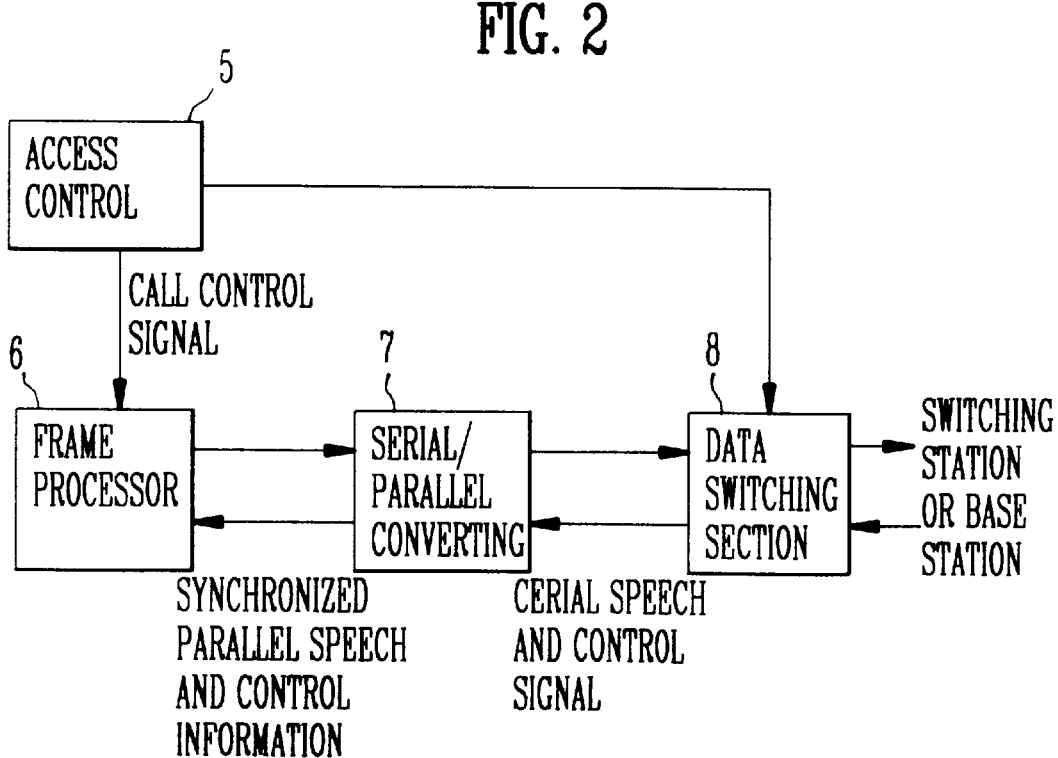

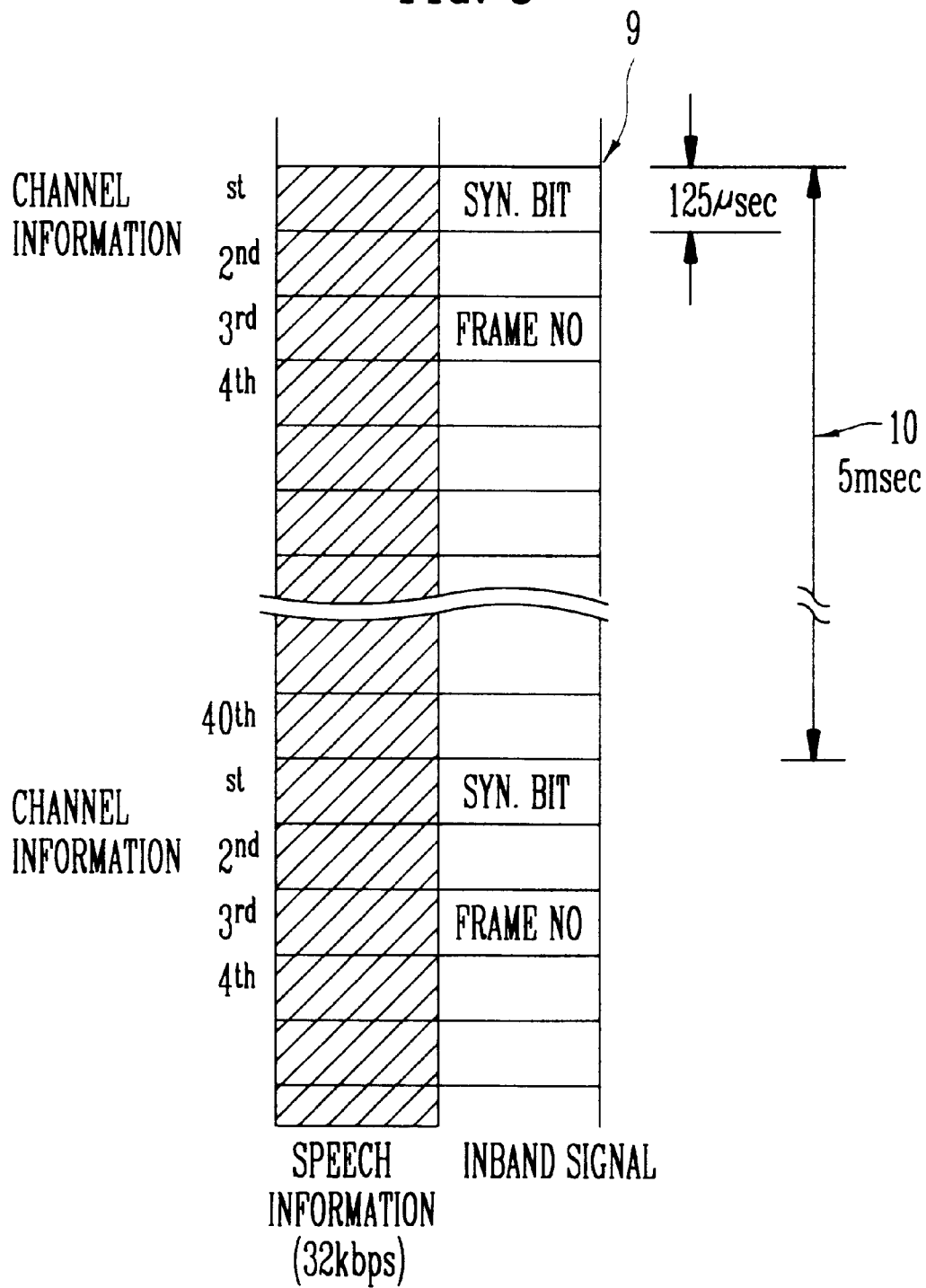

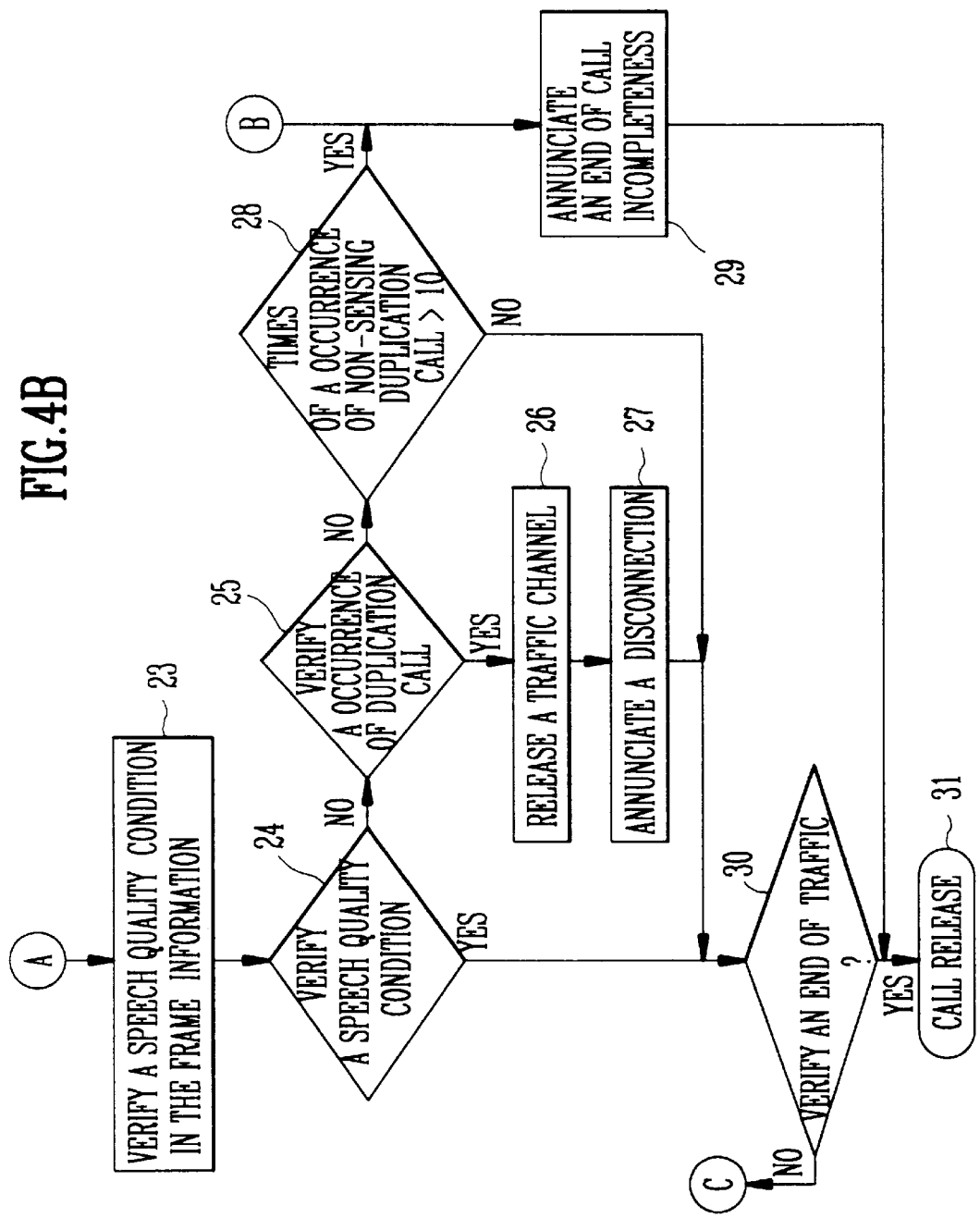

VOICE CODING METHOD AT A CODE DIVISION MULTIPLE ACCESS BASE STATION

BACKGROUND OF THE INVENTION

1. Field of the Invention

The present invention relates to a voice coding method for carrying out a function of speech coding at a CDMA(Code Division Multiple Access) control station or a base station and, more particularly, to an access method between a control station and a base station in PCS(Personal Communication System) service.

2. Information Disclosure Statement

In a cellular mobile communication system of the CDMA method, one mobile terminal can simultaneously maintain traffic paths with two base station apparatuses, and the choice between the two traffic paths can be made at a speech coding apparatus. When the mobile terminal forms a traffic path with a base station apparatus, the base station apparatus checks an information about traffic condition, that is, speech quality condition of the mobile terminal which forms the traffic path with the base station apparatus, and reports the information to the speech coding apparatus. Then, when a mobile terminal forms other traffic path in duplicate with other base station apparatus due to movement under a condition in which the mobile terminal forms a traffic path with an arbitrary base station apparatus and is engaged in a traffic, the speech coding apparatus analyses the speech quality condition information and selects as an actual traffic path the traffic path which is in better condition among the two traffic paths. Such change of traffic path is caused since the mobile terminal moves to a cell of other adjacent base station apparatus during the traffic in a base station cell, and such movement is called as "Hand-off" and becomes an important technical method for improving the speech quality in the CDMA mobile communication system.

Since the speech coding apparatus has to know where is the relevant pure speech information which the speech quality information points to(property of real time of speech quality information) at the time of decoding or analyzing the speech quality information to select a traffic path, the speech quality information uses an Inband Signalling method in which an inband signal is transmitted by forming a frame together with the pure speech quality information. Therefore, there are four types of information transmitted between the base station apparatus and the speech coding apparatus, that is, an information related to an call control and status control, the pure speech information, and the frame synchronization(sync) information and the inband signalling information which receives from the base station in real time a speech quality information of radio section when the mobile terminal is in traffic state. The pure speech information, frame sync information and inband signalling consists a packet frame to guarantee the property of real time of information and are transceived in a packet method.

Since the speech coding apparatus shall receive from the base station the speech quality information of radio section in real time (that is, the speech quality information is needed at the same time with the relevant speech information) when a mobile subscriber is in traffic state in the conventional cellular mobile communication system which follows the CDMA method, the speech coding apparatus has to follow the inband signalling method and therefore uses the packet communication method which facilitates the constitution of frame and the transmission and reception. In this case, in the conventional cellular system, there are flexibility and conveniences in making an information frame and transmitting the information, however, the usage efficiency is low for transmission channel in view of the characteristics of packet method so that the subscriber accommodating capacity is reduced and there is a limitation on the constitution of apparatus being a cause of increase in constitution expenses. As an improvement the circuit communication method can be considered, however, since the packetized information must be transmitted in the circuit communication method in view of the CDMA method, the acquisition of frame sync between the base station and control station appears to be a difficult problem.

SUMMARY OF THE INVENTION

Therefore, the object of the present invention is to increase the efficiency of the transmission channel between the base stations and to improve the accuracy of the signal in transmitting the traffic information in the circuit communication method or TDM method in comparison with the packet method, and to provide the method for speech coding at the code division multiple access base station which can solve the anticipated problem of the frame sync acquisition between base station in such case.

A speech coding method at Code Division Multiple Access base station according to the present invention to accomplish the above described object is characterized in that it comprises the steps of:

a first step for performing a message synchronization for each call for frame sync acquisition before a call start;

a second step for performing a byte synchronization to verify whether a sync byte in each frame has a normal value at a normal position during a call maintenance; and a third step for call cancellation by verifying the occurrence of duplicated calls of same traffic subscriber according to a speech quality condition by verifying the position of a speech quality parameter in a frame information received in the Time Division Multiplexing method during the call maintenance or by verifying the traffic end.

BRIEF DESCRIPTION OF THE DRAWINGS

FIG. 1 is a block diagram of a code division multiple access system to which the present invention is applied;

FIG. 2 is a constutional drawing of a speech coding apparatus according to the present invention;

FIG. 3 is a structural drawing showing a frame shape between a frame processor and base station.

DETAILED DESCRIPTION OF THE PREFERRED EMBODIMENTS

Figure 4A:
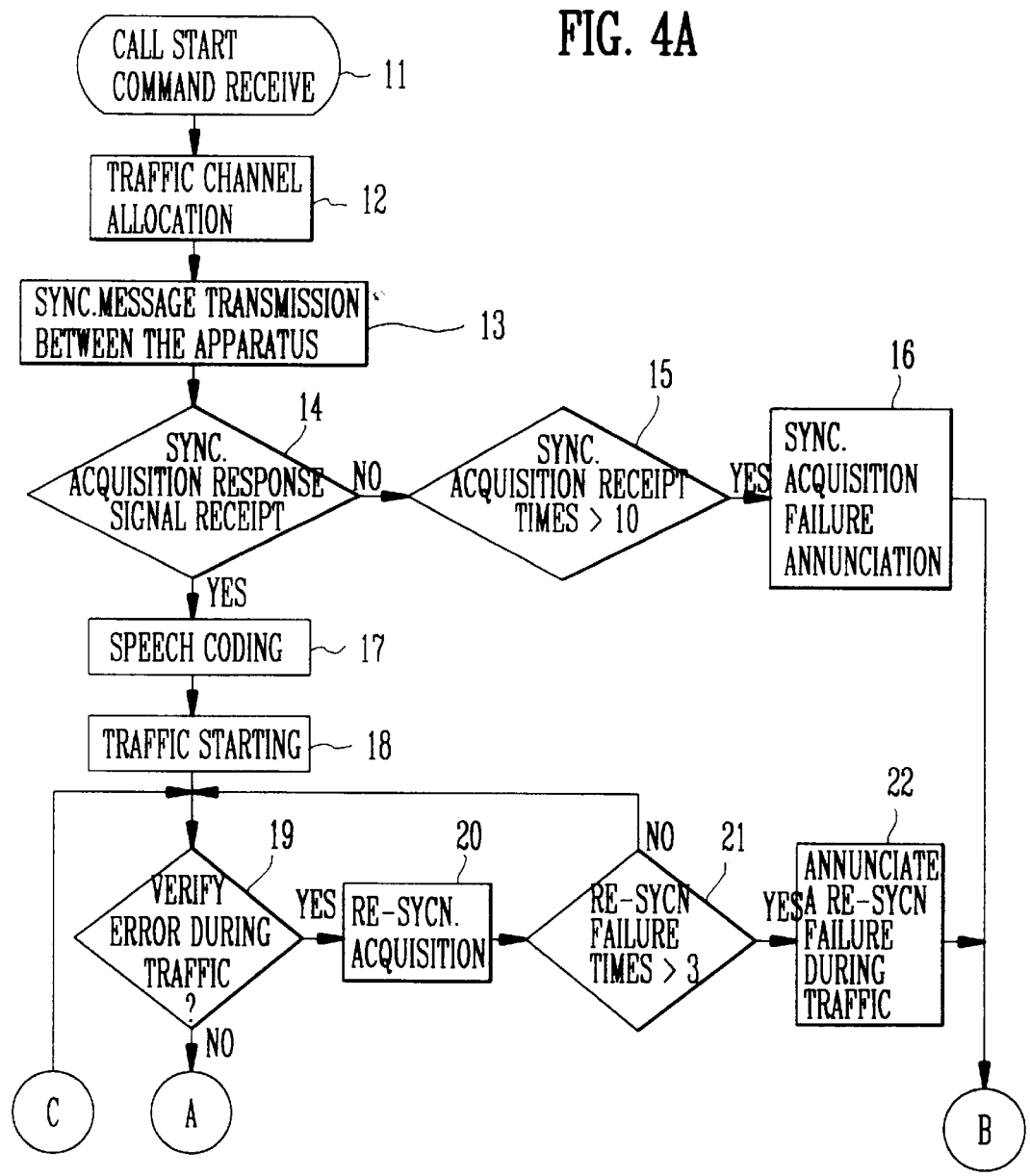
FIG. 4 is a flow diagram to illustrate a speech coding method according to the present invention.

The preferred embodiments of the present invention will be described below with reference to the accompanying drawings.

FIG. 1 is a block diagram of a code division multiple access system to which the present invention is applied, in which a speech coding apparatus 3 is connected to a higher level switching station apparatus 2 and a lower level base station 4 according to the control of a traffic control apparatus 1.

The traffic control apparatus 1 performs a function of controlling a call establishment and cancellation for traffic channels of the base station apparatus 4 by deciding a speech coding time and traffic channel for the speech coding apparatus 3 according to a command of the switching station apparatus 2.

The switching station apparatus 2 performs a function of call administration and switching with other switching station between the speech coding apparatus 3 which is a lower level apparatus and the base station apparatus 4.

The speech coding apparatus 3 consist of a digital signal processor, micro processor means and channel switch means, and converts ADPCM speech signal to PCM speech signal or vice versa, and performs a function of processing the inband signalling in view of the CDMA characteristics and acquiring a tranceiving frame sync between base station apparatuses 4.

The base station apparatus 4 transmits to and receives to the speech coding apparatus 3 the speech and control informations and performs a function of modulation and demodulation for communication with the mobile terminal which is a lower level apparatus.

FIG. 2 is a constitutional drawing of the speech coding apparatus according to the present invention.

An access control 5 consists of a microprocessor means and performs a function of control and decision of traffic channel according to the call generation and cancellation to make the speech coding function to be performed at a frame processor 6, etc.

The frame processor 6 is a digital signal processor means and consists of TMS320C40 of Texas Instrument Co. and performs a function of speech coding or decoding as a function of data matching between the base station apparatus 4 and switching station apparatus 2 as well as the function of frame sync acquisition.

A serial/parallel converting section 7 consists of a programming logic means and converts the speech and control information from a serial signals of a data switching section 8 to a parallel signals of the frame processor 6.

The data switching section 8 consists of a switch means and performs a function of connecting and disconnecting the traffic channel according to the access control 5 for the switching of the traffic channel.

The information channel between the base station apparatus and the frame process can be divided into the control channel and traffic channel. The traffic channel contains not only the speech information but also the speech quality information of radio section and subscriber status information so that it transmits the speech information, as contained as a part in a frame, in a circuit transmission method.

In the sync acquisition method, syncs can be divided into a message sync as a first sync and a byte sync among each frame as a second sync. The frame sync information has a function of an information for accurate transfer of the framed speech information between the base station apparatus 4 and the frame processor 6. The first sync is acquired by exchanging the sync message before call establishment and the second sync is acquired by mutually exchanging and verifying the sync byte by the base station apparatus 4 and frame processor 6 during the call maintenance.

The frame shape between the frame processor 6 and base station apparatus 4 is shown in FIG. 3. When one information at every 125 µsec is transferred through the traffic channel between the frame processor 6 and the base station apparatus 4, if forty channel information are transferred, then 5 msec are elapsed(10) and one frame transfer is completed. Each channel information is composed of one byte. Four bits among one byte are a speech information, and the remaining four bits are inband signalling and are filled with the sync byte 9 or frame number. When the frame transfer is continued between the frame processor 6 and base station apparatus 4, if the sync acquisition is performed only by the sync byte 9, in case where same indication exists in the general channel information it is not discriminated whether the indication is sync byte or general channel information. However, in case of CDMA, since the position of sync byte 9 which becomes the start of 5 msec(10) can be expected in advance by using the fact that each apparatus has same time information for precise sync acquisition, the precise sync acquisition is possible only by verification of sync byte 9.

FIG. 4 is a flow diagram to illustrate the speech coding method according to the present invention.

When the access control 5 receives the call start command from the traffic control apparatus 1 at step 11, the frame processor 6 allocates the traffic channel at step 12 and transmits the sync message to acquire the sync between the base station apparatuses 4 at step 13. At this time, the access control 5 checks whether the sync acquisition response signal is received after the elapse of a certain time at step 14 and, in case where there is no response(step 15), repeats the message sync acquisition process within ten times and, in case where the sync acquisition signal is received(step 17), performs the speech coding thereby starting the traffic at step 18. After the traffic is started, the sync byte in the frame is verified to confirm the presence of abnormality in the sync during the traffic at step 19 and if there is any abnormality, the re-sync acquisition process using the sync byte is performed at step 20.

Although in the message sync method the software load is relatively severe in case where the amount of information is large according to the accuracy or sync verification method, the mobile communication system using the CDMA communication method can minimize the software load and guarantee the accuracy by the sync message transmission utilizing the frame sync information since each apparatus has time information coincident to each other, and further reinforce that by performing the re-sync acquisition process (step 20). When the normal traffic is continued, the speech quality condition included in the inband signalling is verified(step 23) and used for the selection for two calls according to the occurrence of call maintenance paths through two base station apparatuses to one speech coding apparatus. When the continuous failure of initial sync(step 16), the continuous failure of re-sync during the traffic(step 22) and the continuous occurrence of non-sensing of duplicated calls(step 28) are occurred, the incomplete call ending process is performed at step 29.

As described above, the speech coding apparatus operation flow diagram embodies the efficient sync acquisition method in case where the circuit communication method is applied for increasing the channel accommodation capacity by interlocking the base station apparatus with the frame processor and the data switching section.

As described above, the present invention has following effects by utilizing to the function of sync acquisition the Time Division Multiplexing communication method between the base station apparatus and the speech coding apparatus in the mobile communication system of the CDMA method for PCS service;

First, the efficiency in the usage of transmission channel between the speech coding apparatus and base station apparatus is increased and the system construction expenses can be minimized according to the increase in the traffic accommodating channels by transmitting the packet frame occurred in view of the CDMA characteristics in the circuit communication method.

Second, the load on the speech coding apparatus according to the sync acquisition can be minimized so that the construction of the speech coding apparatus becomes easy and the accuracy of the transmitted signal is increased by adopting the message sync method which uses the fact that each apparatus in CDMA system has same time information.

Third, the reliability on the system is increased since the plurality of apparatuses are interlocked in PCS service.

What is claimed is:

1. A method of speech coding at a Code Division Multiple Access (CDMA) base station, comprising the steps of:

(a) performing a message synchronization for a call frame for acquiring a frame synchronization before a call start command is received at the base station;

(b) performing a byte synchronization for each said call frame to verify whether a synchronization byte in said each call frame has a normal value at a predetermined position during call maintenance; and (c) cancelling a call by verifying the occurrence of duplicated calls of a subscriber according to a speech quality parameter in a Time Division Multiplexed (TDM) frame information received at the base station during call maintenance.

2. The method of claim 1, wherein said step (c) further comprises the step of cancelling a call by verifying an end of call traffic.

3. The method of claim 1, wherein said step (a) comprises:

(a) allocating, by a frame processor apparatus, a traffic channel when an access control apparatus receives a call start command from a traffic control apparatus;

(b) transmitting, from a first base station, a synchronization message to acquire synchronization between the first base station and a second base station;

(c) confirming whether a synchronization acquisition response from the second base station is received by the first base station within a predetermined period of time;

(d) if the synchronization acquisition response from the second base station is not received by the first base station within the predetermined period of time, retransmitting, from the first base station, a synchronization message to acquire synchronization between the first base station and the second base station; and (e) if the synchronization acquisition response from the second base station is received by the first base station within a predetermined period of time, speech coding at the first base station so as to enable call traffic between the first base station and the second base station.

4. The method of claim 3, further comprising repeating said step (d) at least ten times if necessary to acquire synchronization between the first and second base stations.

5. The method of claim 1, wherein said step (b) comprises:

determining whether a synchronization error has occurred during a call by checking said synchronization byte in said each call frame after a call start command is received at the base station;

if no synchronization error has occurred, verifying a speech quality condition included in an inband signal in said each call frame during a call by checking said synchronization byte in said each call frame;

if a synchronization error has occurred, performing a byte synchronization using said synchronization byte in said each call frame.

6. The method of claim 5, further comprising performing a byte synchronization using said synchronization byte in said each call frame three times.

* * * * *